Patented June 1, 1926.

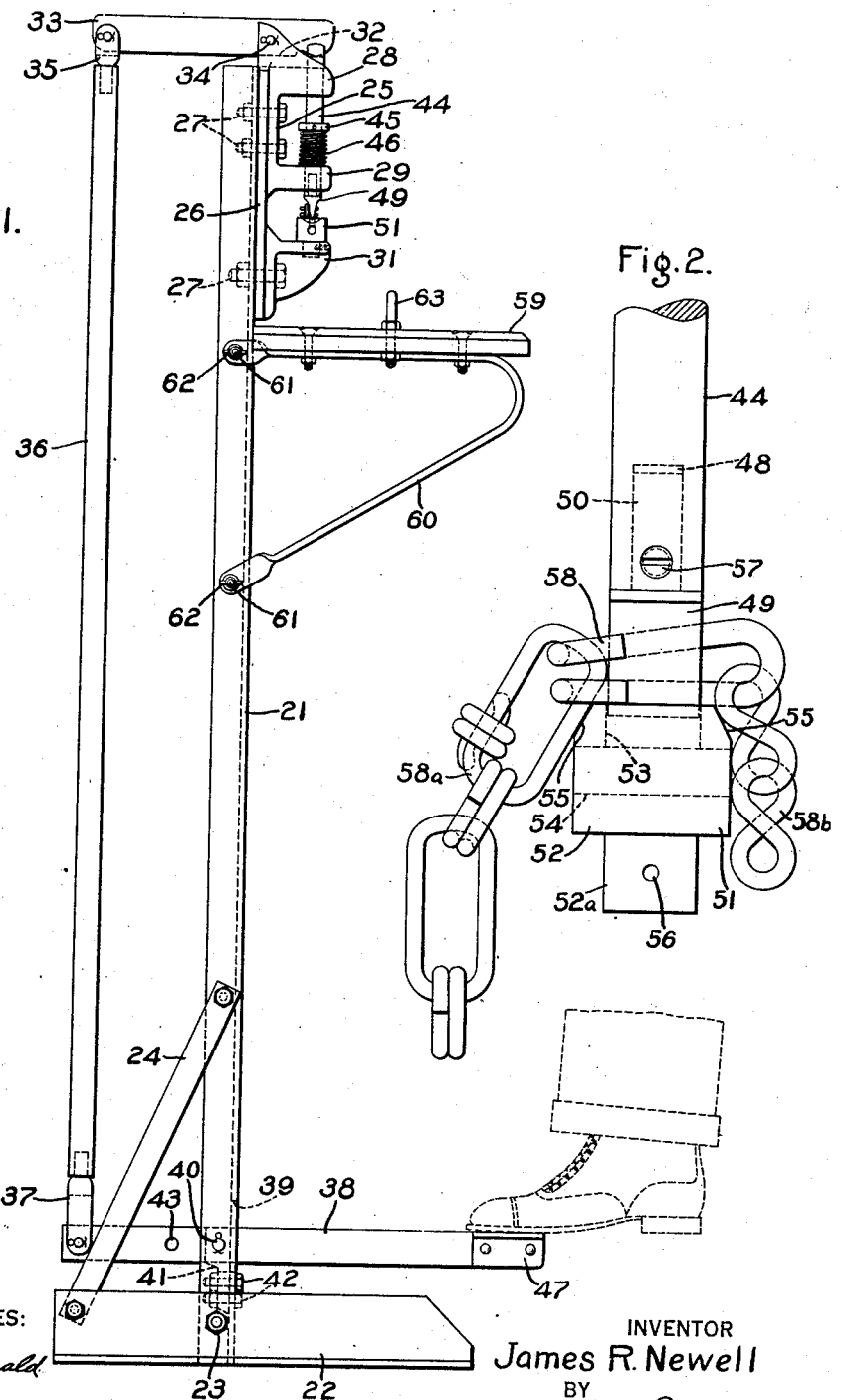

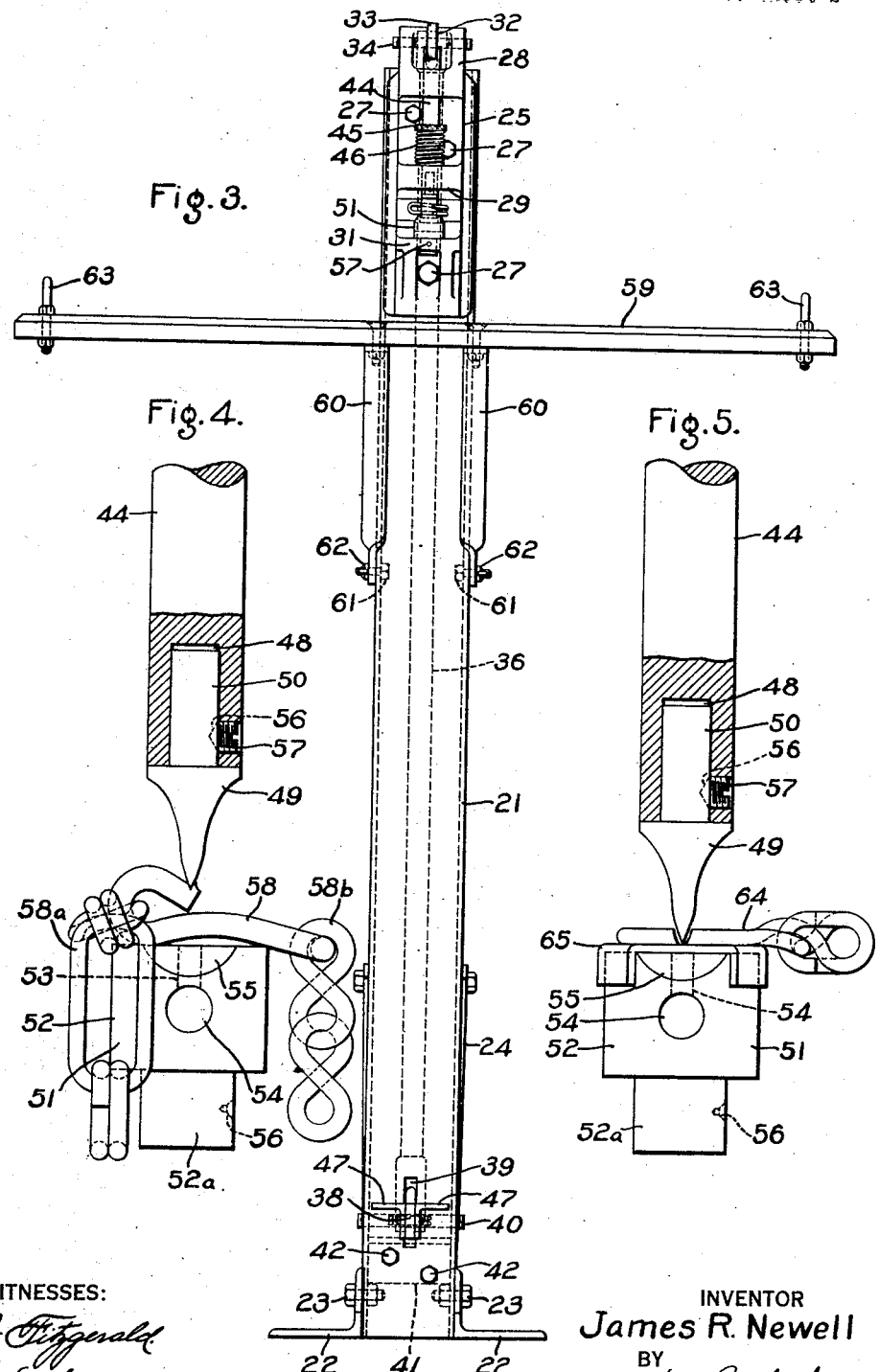

1,586,568

UNITED STATES PATENT OFFICE.

JAMES R. NEWELL, OF PITTSBURGH, PENNSYLVANIA.

TIRE-CHAIN TOOL.

Application filed November 27, 1923. Serial No. 677,341.

My invention relates to motor vehicles accessories and particularly to tools for operating on tire chains.

One object of my invention is to provide a relatively simple, compact, light-weight, and self-contained device for removing and attaching cross chains of automobile tire chains.

In repairing tire chains, when links of the cross chains have been broken by use, it is customary to remove the pieces of the broken cross chain, and to replace the broken chain by an entirely new one. This necessitates the opening of both end links of the broken chain, these end links being of different form from the intermediate links, and of closing both end links of the new cross chain over the co-operating links of the respective side chains.

Another object of my invention is to provide a device that shall open and close the end links of tire cross chains, with a single continuous movement only of the co-operating members.

In practicing my invention I provide an upright standard, an anvil suitably mounted thereon, and a double bevel wedge member, normally yieldingly held in its inoperative position, that is moved toward the anvil to open or to close chain links.

In the drawings,

Figure 1 is a view, in side elevation, of a device embodying my invention,

Fig. 2 is a view, in front elevation and on an enlarged scale, of a portion of a device embodying my invention, illustrated as opening a chain link, Fig. 3 is a view, in front elevation, of a device embodying my invention, Figs. 4 and 5 are views, in side elevation and on an enlarged scale, of a portion of a device embodying my invention, operating on chain links.

An upright standard 21 comprising a suitable length of a steel member, of channel section, has its lower end secured to and supported by a pair of spaced angle-iron members 22, each of a suitable length. Bolts 23 and co-operating nuts are employed to secure one flange of the angle-bar members 22 to the side flanges of the member 21. A brace bar 24 may be provided, having its ends bolted respectively to one of the angle bar members 22 and to the upright member 21 in order to stiffen the structure.

A metal casting 25, that comprises, in general, a vertically-extending flange portion 26 is bolted against the front surface of the standard 21 at its upper end, by a plurality of bolts 27 having co-operating nuts mounted thereon. The member 25 is provided with a plurality of spaced and forwardly-extending integral portions 28, 29, and 31, all of substantially the same length.

The portion 28 is provided with an intermediate slot 32 through which there extends a lever 33, that is pivotally mounted, intermediate its ends, on a pin 34 that extends through the two parts of the portion 28. An end member 35 is pivotally connected to the rear end of the lever 33 and has its other end in screw-threaded, adjustable, engagement with an elongated member 36, of rod or of tubular form, that extends substantially parallel to the standard 21 at the back thereof. An end member 37, substantially similar to the end member 35, operatively engages the lower end of the member 36 and is pivotally connected to one end of a foot lever 38 that extends through the member 21 immediately above the angle bar members 22, an opening 39 being provided in the intermediate portion of the upright member for this purpose. In order to provide a support having sufficient strength for a pivot pin 40 on which the pedal lever 38 is mounted intermediate its ends, I employ a suitable casting 41 that is located against the inner surface of the member 21 intermediate the side flanges and is bolted thereagainst by a plurality of bolts 42 having co-operating nuts thereon. An extra hole 43 is provided in the lever 38 close to the rear end thereof, to permit of obtaining a greater leverage whenever necessary.

A plunger member 44, of rod shape, has its upper end slotted to receive the rounded front end of the lever 33 and moves in suitable openings provided in the forward ends of the integral portions 28 and 29 of the casting 25. An annular flange member 45 is secured on the plunger 44 intermediate its ends, and an open helical compression spring 46 is located thereon, and extends between the flange 45 and the upper surface of the portion 29, whereby the plunger is yieldingly maintained in its normal inoperative position at the upper end of its travel. In this position the forward end of the foot pedal lever 38 is in its highest position and may be engaged by the foot of an operator standing in front of the device to have its forward end moved downwardly, thereby causing a downward movement of the plunger 44 and of any tool operatively secured thereto. The lever 38 may have short pieces 47, of suitable angle bars, mounted thereon at its front end to provide a platform for the operator's foot.

The lower end of the plunger 44 is provided with a suitable axial opening 48 to receive a tool to work on chain links of automobile tire chains. When it is desired to operate on tire chains, either to open or to close them, I mount a double bevel wedge member 49 in the plunger member 44, the wedge member 49 being provided with an integral upper portion 50 that fits closely in the opening 48. Adjacent to its lower end the wedge member 49 is provided with a double bevel, as is more particularly illustrated in Figs. 4 and 5 of the drawing, and the lower edge of the member 49 is made as a sharp cutting edge. The angle between the two faces of the wedge member is relatively large for a short distance back of the lower edge, after which the angle therebetween is less.

An anvil 51, having an enlarged upper round portion 52, and a lower portion 52ª, of reduced diameter, is located in and on the portion 31 of the member 25, a suitable opening being provided in the member 31 to receive the portion 52ª. The upper surface of the portion 52 is substantially plane, and a relatively narrow and elongated slot 53 is provided in the portion 52 to receive the lower end of the wedge member 49 when it is moved downwardly toward the anvil. A laterally-extending opening 54 is provided in the portion 52 to permit of cleaning out the slot 53. The portion 52 is provided, at its upper edge, with two symmetrically spaced beveled portions 55, for a purpose to be hereinafter described in detail. The portion 52ª of the anvil and the upper reduced portion of the wedge member 49 may each be provided with a countersunk opening 56, to permit of securing them in the portion 31 and in the plunger 49 respectively, by headless set screws 57.

The end links of tire cross chains are usually of double return-bent form, a link of this kind being illustrated in Figs. 2 and 4 of the drawings and designated by the numeral 58. A portion of a side chain 58ª is illustrated in Fig. 4 of the drawing as connected to the rounded and return-bent portions of the end link 58 and a plurality of intermediate links 58ᵇ of the cross chain are illustrated as connected to the end link at its other end.

When it is desired to remove the end links of a broken cross chain it is necessary to open them and they are placed successively on the upper plane surface of the portion 52 of the anvil in substantially the position illustrated in Figs. 1, 2 and 3 of the drawings. The cross chain end link 58 is laid on the anvil in such position that the wedge member 49 may be inserted between the return-bent end portions and the intermediate straight portions of the end link as is illustrated more particularly in Fig. 2 of the drawings. The reduced width of the upper surface of the portion 52, by reason of the beveled portions 55, permits of positioning the link 58 substantially centrally on the anvil, the link of the side chain 58ª operatively engaged by the end link 58 fitting closely against one of the beveled surfaces 55. The operator presses downwardly on the pedal lever 38 causing the plunger member 44 and the wedge member 49 to move downwardly, the sharp lower edge thereof entering between the main portions of the link and the return-bent end portions and forcing them apart. The lower end of the wedge member 49 enters the longitudinal slot 54 when at the lower limit of its movement. Fig. 1 of the drawings illustrates the foot pedal lever in its fully depressed position, and the parts attached thereto and actuated thereby are shown at the limit of their operative movement.

I have found that by employing a wedge member of substantially the form illustrated more particularly in Figs. 4 and 5 of the drawing, and having a double bevel, I am able to open a cross chain link without its sticking or becoming wedged upon the wedge member 49. I am of the opinion that this is because of the fact that the angle of the bevel of the wedge member is relatively large at first, thereby causing the link to open quickly, after which the bevel decreases and the link is not forced open as fast as it was originally, thereby reducing the initial stress in the rounded portion of the link to such an extent that the link does not bind or stick on the wedge member. This non-sticking or non-wedging feature constitutes a valuable feature of my invention, as it permits of opening a cross chain end link with but a single operative movement of the device that may be effected in a minimum time.

When it is desired to close a cross chain end link it is placed on the anvil 52 in such position that the rounded end portions thereof are on the upper side thereof, as is illustrated more particularly in Fig. 4 of the drawing. The operator lays the chain link 58 on the upper plane surface of the portion 52 of the anvil and then presses downwardly with his foot on the lever 38, positioning the link 58 by hand so that the lower sharpened edge of the wedge member 49 operatively engages the link closely adjacent to the ends of its rounded portions, and initially notches the same, as is illustrated more particularly in Fig. 4. This notching engagement of the sharpened edge with the chain link positions it on the top of the anvil while closing the same, and thereby holds the chain link in proper position to be operated upon by the wedge member to close the heretofore open ends thereof.

A table 59 may be mounted against the upright standard 21 immediately below the casting member 25, upon which tire chains may be laid while having broken cross chains removed or while having new cross chains secured thereto by closing the end links thereof as has been hereinbefore described. The table 59 may be supported by metal members 60, of substantially U-shape, one leg thereof extending substantially horizontally as is illustrated more particularly in Fig. 1 of the drawing. The ends of the members 60 are secured against the member 21 by bolts 61 having butterfly nuts 62 mounted thereon to permit of easy and quick removal of the table whenever desired. Pins 63 may be provided on the table 59 adjacent to each end thereof to hold the other portions of a tire chain and prevent it sliding or falling off the table while it is being operated upon as described above.

It may become necessary at times to cut a link of a side chain or an end link of a cross chain and Fig. 5 illustrates the use of my device when employed for cutting a link in a side chain.

A side link 64 of a tire chain is illustrated as being located on the anvil to be cut. A cover plate 65, having an upper plane surface and a plurality of depending integral flange portions, fits closely upon the upper surface of the anvil, and a single downward pressure by the operator on the lever 38 effects a cutting of the side chain link 64, the double bevel wedge member 49 being suitably heat treated for this purpose. The plate 65 is suitably hardened to co-operate with the wedge member 49 in this kind of work. While I have stated above that the wedge member 49 is heat treated or hardened to permit of its use as a cutting chisel, I do not desire to convey the meaning that it would not otherwise be hardened for its normal purpose as I find that the outer surfaces of the wedge member wear very little when they are suitably hardened and are employed for opening and closing chain links.

The device embodying my invention thus provides a relatively simple, compact, unitary, and self-contained device for opening cross chain links of automobile tire chains with a single operative movement of a double bevel wedge member that is effective to properly position the chain link and to hold it while opening the same. The double bevel wedge member is effective to notch cross chain end links immediately adjacent to their outer ends preparatory to closing the same, whereby the cross chain link is properly positioned on the upper plane surface of an anvil during the closing of the link by a single continuous approaching movement of the wedge member toward the anvil. This movement is effected by the operator pressing, with his foot, upon a lever aggregate having a relatively large leverage and leaving his hands free to manipulate the chains as required.

The device embodying my invention also provides a means for cutting off the end links of side chains if this becomes necessary.

Various modifications may be made in the device embodying my invention without departing from the spirit and scope thereof, and I desire to include all such modifications under the appended claims.

I claim as my invention:

1. A tire chain tool for opening and for closing chain links comprising a base, an upright standard supported thereby, a plunger-guide member secured to the standard at the upper end thereof and having a plurality of spaced forwardly extending arms, an anvil having a plane upper surface, suppported by one of said forwardly extending arms for supporting a chain link, a plunger movable in other of said forwardly extending arms, a wedge member secured to the lower end of said plunger, each side of said wedge member having two successive operative faces disposed at different angles relatively to a median line therebetween, a lever pivotally mounted in said plunger-guide member for causing movement of said plunger and wedge member toward said anvil, and a pedal-actuated lever for effecting movement of said plunger-actuating lever.

2. A tire chain tool comprising a base, an upright standard supported thereby, a plunger-guide member secured to the standard at its upper end and having a plurality of spaced forwardly extending arms, an anvil having a plane upper surface supported by the lowermost arm and adapted to support a chain link to be operated on, a plunger movable in the two uppermost forwardly extending arms, resilient means engaging the lower of the plunger-guiding arms for normally yieldingly holding the plunger in its raised position, a wedge member secured to the lower end of said plunger, each side of said wedge member having two successive operative faces disposed at different angles relatively to a median line therebetween, said wedge member being effective to open or to close a chain link located on said anvil, by a straight line approaching movement, a lever pivotally mounted in said plunger-guide member for causing movement of said plunger and said wedge member toward said anvil, and a pedal-actuated lever for effecting movement of said plunger-actuating lever.

3. A tire chain tool comprising a base, an upright standard supported thereby, a plunger-guide member secured to the standard at its upper end and embodying a plurality of spaced forwardly extending arms, an anvil having a plane upper surface, supported by the lowermost forwardly extending arm and adapted to support a chain link to be operated on, a plunger movable in the uppermost forwardly extending arms, a spring operatively engaging the lowermost arm and the plunger for normally yieldingly holding the plunger in its raised position, a wedge member secured to the lower end of the plunger for opening and for closing chain links located on said anvil, a lever pivotally mounted in said plunger-guide member for causing downward movement of the plunger and the wedge, a foot-pedal actuated member for moving said plunger-actuating lever, a chain-supporting-table located below said plunger-guide member and operatively supported by the upright standard, and pins on said table for engaging and holding a tire chain while being operated on.

In testimony whereof, I have hereunto subscribed my name this nineteenth day of November, 1923.

JAMES R. NEWELL.